United States Patent [19]

Robbins, Jr.

[11] 4,027,651

[45] June 7, 1977

[54] SOLAR-ENERGY-POWERED SUN TRACKER

[76] Inventor: Roland W. Robbins, Jr., 825 E. California Blvd., Ridgecrest, Calif. 93555

[22] Filed: Feb. 17, 1976

[21] Appl. No.: 658,544

[52] U.S. Cl. .......................... 126/270; 250/203 R
[51] Int. Cl.² ................ H24J 3/02; G01J 1/20
[58] Field of Search .................. 126/270, 271; 250/203 R

[56] References Cited

UNITED STATES PATENTS

| | | | |
|---|---|---|---|
| 2,135,997 | 11/1938 | Arthuys | 126/270 |
| 3,213,285 | 10/1965 | McCusker | 250/203 R |
| 3,229,102 | 1/1966 | Spencer et al. | 250/203 R |
| 3,268,185 | 8/1966 | Eckermann | 250/203 R |
| 3,305,686 | 2/1967 | Carter et al. | 250/203 R |

Primary Examiner—Carlton R. Croyle
Assistant Examiner—Robert E. Garrett
Attorney, Agent, or Firm—R. S. Sciasica; Roy Miller; David J. Aston

[57] ABSTRACT

An apparatus for causing a solar energy collector to constantly follow the sun using the sun's radiant energy reflected from an arrangement of mirrors to differentially heat fluid-containing reservoirs to create a differential pressure which is utilized to rotate the apparatus and the collector.

5 Claims, 2 Drawing Figures

SOLAR-ENERGY-POWERED SUN TRACKER

STATEMENT OF GOVERNMENT INTEREST

The invention described herein may be manufactured and used by or for the Government of the United States of America for Governmental purposes without the payment of any royalites thereon or therefor.

BACKGROUND OF THE INVENTION

This invention relates to a solar energy device and more particularly to a tracker for maintaining itself and another device such as a solar energy cell or collector continuously pointed towards the sun, employing solar energy to provide the moving force.

Solar tracking devices have been known for many years. Sunlight reflectors called heliostats have long been used to maintain a beam of sunlight on a constant direction. The reflectors were rotated by a clockwork or an auxiliary power supply such as an electric motor. Sunlight was used to trigger regulating devices for the external power supply. Aside from additional energy use, electrically powered aiming systems require a power supply with a constant frequency and voltage and a separate feedback path to correct for error.

Of course in many cases, it would be desirable to utilize solar energy to rotate the reflector or other device (termed generally herein the collector) in the proper direction.

While most tracking devices employ external power supplies, a number of devices have been developed which employ solar energy to direct and rotate the collector.

For instance, Geer in U.S. Pat. No. 2,999,943, discloses a device with two sealed jars on either side of a swivel connected by a tube and filled with a volatile liquid. Lord in U.S. Pat. No. 3,231,284, discloses an S shaped Bourdon tube for use in a heliotropic (sun following) device. These devices, while effective, are limited in accuracy, responsiveness and in the type of environment in which they may be used.

For example, the device described by Geer is not designed to be sensitive to a slight apparent movement of the sun. There is a lag caused by the time necessary for the liquid to vaporize and recondense; and it relies on gravity to tilt the device.

SUMMARY OF THE INVENTION

Accordingly, there is provided a solar tracker utilizing a system of mirrors whereby if sunlight approaches the device at other than the desired angle, a volatile liquid or a gas contained in a length of tubing is either heated or cooled. The fluid thus contracts or expands creating mechanical energy which may be channeled through a piston to rotate the collector and the tracker.

DESCRIPTION OF THE PREFERRED EMBODIMENT

Figure 1:
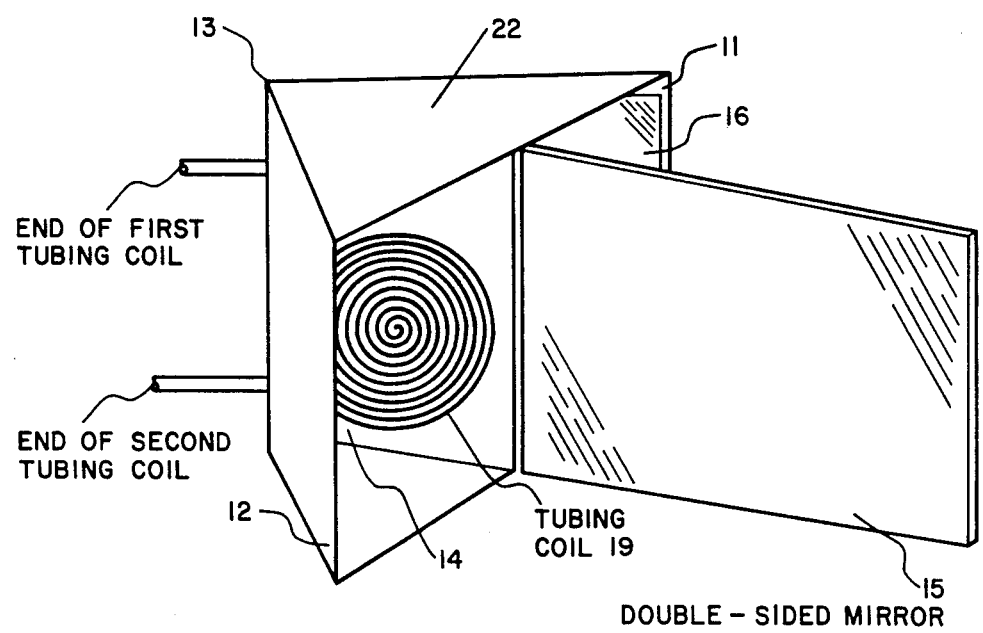
FIG. 1 shows a perspective view of the solar tracker according to this invention.

Referring now to the drawings wherein like reference characters designate like or corresponding parts throughout the several views, and more particularly to FIG. 1 thereof, a wedge-shaped housing with walls 11, 12 coupled to one another at point 13 with a central divider 14 supports the solar tracker. The angle between the walls 11 and 12 may be between approximately 30° and 150° with the divider 14 approximately bisecting this angle. Extending forward from divider 14 is a doublesided mirror or reflector 15. A first side mirror 16 is mounted on the inner side of wall 11 and a second side mirror 17 is mounted on the inner side of wall 12. A first tubing coil 18 is mounted on one side of divider 14 facing wall 11 and its mirror 16.

Figure 2:
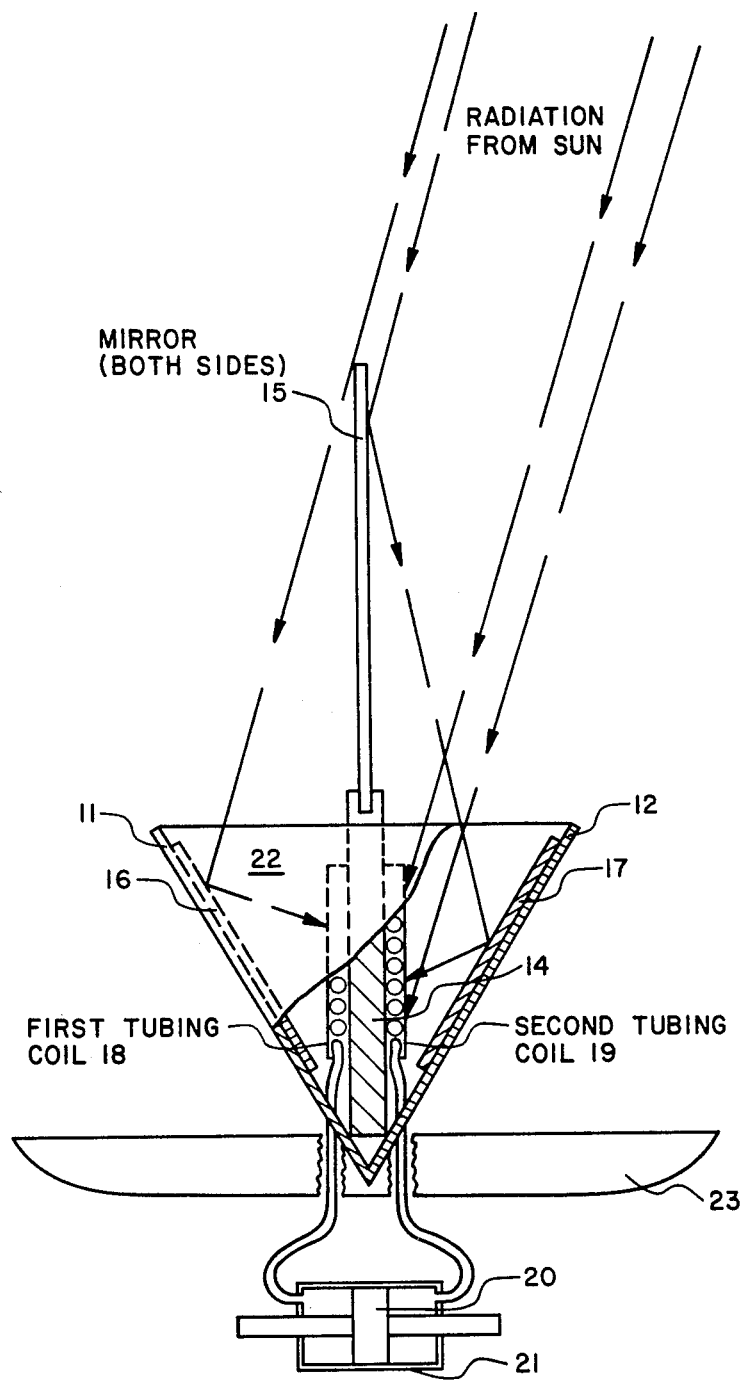
FIG. 2 shows a plan view of the solar tracker according to this invention, with parts broken away and sectioned for clarity.

Similarly, a second tubing coil 19 is mounted on the other side of divider 14 facing wall 12. These coils are arranged as flat spirals with one end of the tubing in the center of the coil and the other end extending out through the housing. Referring now to FIG. 2, if double-sided mirror 15 is not pointed directly at the sun, one tubing coil 18 receives little if any sunlight, being shaded by the double sided mirror and the divider. The second tubing coil 19 receives sunlight directly, and also from side mirror 17, the light from the side mirror having been reflected from the double sided mirror 15. The double-sided mirror 15, acts as a sort of differential amplifier of radiant energy. The top of the housing 22 connecting the tops of walls 11, 12, also promotes differential heating of coils 18, 19 when the sun is off-center by shading the coils from sunlight other than that controlled by the mirrors 15, 16 and 17.

It can be seen that the heating differential between the tubing coils 18 and 19 is greater when the sunlight strikes the double-sided mirror 15 at a greater angle. More heat is generated more rapidly when more correction is necessary. Tubing coils 18 and 19 are black for maximum heat absorption. In the present embodiment, they are arranged in a flat spiral to expose a maximum length of tubing to the sun. Tubing coil 18 and 19 are sealed and contain a liquid. Preferrably the gaseous phase of the liquid is one which shows a substantial increase in saturation pressure as a function of temperature increase, has a saturation pressure at a reasonably low level (e.g., less than 500 psi) over the operative temperature range; is not toxic or highly corrosive; is inexpensive and readily obtainable; and does not have its critical temperature within the temperature range of interest. Both ammonia and freon meet the above criteria.

As described above, when the sun moves off center from the device one tubing coil is heated more than the other. The liquid in the heated coil begins to increase its vapor pressure through the coil according to gas laws. The inner end of the tubing in each coil is sealed. The other end exits the rear of the housing and the collector 23 to a piston 20 in cylinder 21 as shown in FIG. 2. The vapor pressure from the tubing will cause the piston 20 to move in the direction of the lowered pressure. Using pneumatic principles, a small pressure in the tubing can be translated into a much larger force, on the order of several hundred pounds, on the piston.

The sun tracker of the present invention is itself a solar energy convertor and collector. However, it is designed to be utilized with another module 23, such as a solar energy cell or collector particularly one of parabolic design wherein it is important to maintain precise aim toward the sun. The collector 23 is mounted so as to rotate on at least one axis and the tracker moves in unison with the collector. The tracker may be mounted on the collector 23, as shown in FIG. 2. The piston assembly may be placed either in a fixed position, as shown in FIG. 2 or on the rotatable collector 23. The piston pushes against the collector or the collector-tracker complex and a fixed object. The assembly to be rotated should be rather well balanced and free of friction, and a light frame would be desirable. Of course, the size of the tracker could be modified to accomodate a device of any size or weight.

When following the sun's path, the tracker need move in only one direction (east to west) if used for horizontal movement. A simple biased return mechanism, such as a spring can be incorporated to return the tracker to an eastward looking position at sunset. If used to follow the sun's vertical movement, it need change direction only once, at midday. The pressures in the two coils 18 and 19 need only maintain a slight differential pressure bias to follow the sun in a smooth motion. A slight lag will be inherent because there must be some pressure differential maintained between the coils to provide the driving force for the system. The lag may be compensated for by the angle at which the tracker is attached to the assembly to assure no pointing error in the collector itself.

Thus it is apparent that there has been provided a solar energy powered tracking device which is accurate, compact, inexpensive, easy to maintain and unaffected by gravity and other environmental factors. It is to be understood that what has been described is merely illustrative of the principles of the invention and that numerous arrangements in accordance with this invention may be devised by one skilled in the art without departing from the spirit and scope thereof. For instance, polished metal could be used instead of a mirror as a reflector; two tracking devices could be used for aiming on two axes or a rotary, rather than a linear type, piston may be used. A series of parallel rods rather than a coil may be employed as the fluid reservoir.

What is claimed is:

1. Apparatus for aiming a rotatable solar energy collector constantly towards the sun comprising:
    a housing open on one side;
    a central divider mounted inside said housing so as to divide said housing into two compartments each open on said side;
    a first mirror, in the first of said two compartments, mounted on said housing so as to face said divider;
    a second mirror, in the second of said two compartments mounted on said housing so as to face said divider;
    a first fluid containing reservoir mounted on one side of said divider and facing said first mirror;
    a second fluid-containing reservoir mounted on the second side of said divider and facing said second mirror;
    means for translating vapor pressure of said first and second reservoirs into movement of said apparatus and said collector whereby the vapor pressure provides the motive force for the movement; and
    means for shading one of said two compartments from the sun when said central divider is not boresighted towards the sun.

2. The apparatus of claim 1 wherein said means for shading comprises
    a double-sided reflector extending from and coplanar with said divider.

3. The apparatus of claim 2 wherein each fluid-containing reservoir is a flat, spiralled coil.

4. The apparatus of claim 2 wherein said translating means comprises a piston driven by differential pressure from each of said fluids.

5. The apparatus of claim 2 wherein each of said fluids is ammonia.

* * * * *